(12) United States Patent
Wu

(10) Patent No.: US 6,765,555 B2
(45) Date of Patent: Jul. 20, 2004

(54) PASSIVE OPTICAL MOUSE USING IMAGE SENSOR WITH OPTIONAL DUAL MODE CAPABILITY

(75) Inventor: Raymond Wu, Los Gatos, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 229 days.

(21) Appl. No.: 10/005,777

(22) Filed: Nov. 7, 2001

(65) Prior Publication Data

US 2003/0085877 A1 May 8, 2003

(51) Int. Cl.[7] .................................................. G04G 5/08
(52) U.S. Cl. .................. 345/166; 345/163; 250/214 AL
(58) Field of Search ................................ 345/166, 163, 345/158; 250/214 AL; 382/312, 313, 314

(56) References Cited

U.S. PATENT DOCUMENTS

| | | | | |
|---|---|---|---|---|
| 4,647,771 A | * | 3/1987 | Kato ....................... 250/237 R |
| 5,595,445 A | * | 1/1997 | Bobry ........................... 400/88 |
| 5,644,139 A | | 7/1997 | Allen et al. | |
| 5,786,804 A | | 7/1998 | Gordon | |
| 6,115,482 A | | 9/2000 | Sears et al. | |
| 6,172,354 B1 | * | 1/2001 | Adan et al. .................. 250/221 |
| 6,281,882 B1 | | 8/2001 | Gordon et al. | |
| 6,392,632 B1 | * | 5/2002 | Lee .............................. 345/158 |
| 6,513,717 B2 | * | 2/2003 | Hannigan .............. 235/462.45 |
| 6,525,306 B1 | * | 2/2003 | Bohn .......................... 250/221 |
| 2002/0080121 A1 | * | 6/2002 | Son ............................. 345/166 |
| 2003/0034959 A1 | * | 2/2003 | Davis et al. ................. 345/166 |

FOREIGN PATENT DOCUMENTS

EP 1130906 A2 9/2001
WO WO 99/32960 7/1999

* cited by examiner

Primary Examiner—Steven Saras
Assistant Examiner—Leland R. Jorgensen
(74) Attorney, Agent, or Firm—Perkins Coie LLP

(57) ABSTRACT

A passive optical mouse is provided. The mouse does not require an interrogating light source. Instead, the mouse includes a sensor array and lens assembly that captures ambient images from arbitrary sources. A comparison is made between successive images to determine movement of the mouse. The movement of the mouse causes a movement vector to be output, which is used to control movement of a cursor of a computer. In addition, the mouse is configured to provide dual mode operation wherein the mouse can also operate as a video camera.

5 Claims, 4 Drawing Sheets

PASSIVE OPTICAL MOUSE USING IMAGE SENSOR WITH OPTIONAL DUAL MODE CAPABILITY

TECHNICAL FIELD OF THE INVENTION

The present invention relates generally to computer pointing devices, and more particularly, to an optical mouse having an integrated image sensor for passively receiving ambient images and for translating motion in the received images to a corresponding movement in a cursor.

BACKGROUND OF THE INVENTION

Various types of pointing devices are used as input devices that allow a user to manipulate a cursor of a computer. In laptop computers, a capacitive touch pad is commonly used to manipulate the cursor. For desktop computers, the ubiquitous computer mouse constitutes the large majority of pointing devices. The mouse allows for cursor manipulation on a visual display screen of a personal computer or workstation, for example. Cursor manipulation includes actions such as rapid relocation of a cursor from one area of the display screen to another area or selecting an object on a display screen.

In a prior art "roller ball" mouse, a user controls the cursor by moving the mouse over a surface, such as a mouse pad, so that the cursor moves on the display screen in a direction and a distance that is proportional to the movement of the mouse. The roller ball mouse, however, has drawbacks associated with many other devices that have mechanical parts. Namely, over time the mechanical components wear out, become dirty, or simply break down so that the cursor can no longer be accurately manipulated, if at all.

Recently, "optical" mice that use image sensors have been developed. For example, U.S. Pat. No. 6,256,016 describes an optical mouse that produces a collimated beam of light that illuminates a surface upon which the mouse rests. An image sensor receives the reflected images of the surface as the mouse is traversed across a surface. The changes in successive reflected images are then interpreted as mouse movement, which is then correlated to a desired cursor movement. However, this type of mouse must be used in connection with a surface upon which the collimated beam of light may reflect. Thus, the mouse typically must be in close proximity to a surface because of its need to capture a large amount of reflected light. Additionally, the optical lens system used in the mouse of the '016 patent is adapted to only convey a magnified image of a surface that is in close proximity to the mouse.

Similarly, in U.S. Pat. No. 6,172,354, an image sensor is used to receive light reflected off of a surface. The mouse incorporates a light source that illuminates the surface. The light reflected from the surface is collected by the image sensor as an image. Motion is detected by comparing successive images. However, like the '016 patent, the mouse typically must be in close proximity to a surface. Another example of such a close proximity mouse is shown in U.S. Pat. No. 6,281,882.

The '016 patent, the '882 patent and the '354 patent are referred to herein as close proximity active optical mice. This is because the mice provide their own interrogating light source and the mice must be in close proximity to a surface (on the order of centimeters or less) in order to be operable. However, these characteristics have drawbacks of increased power consumption and limited operating environment, e.g., the requirement for a convenient and smooth surface.

BRIEF DESCRIPTION OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
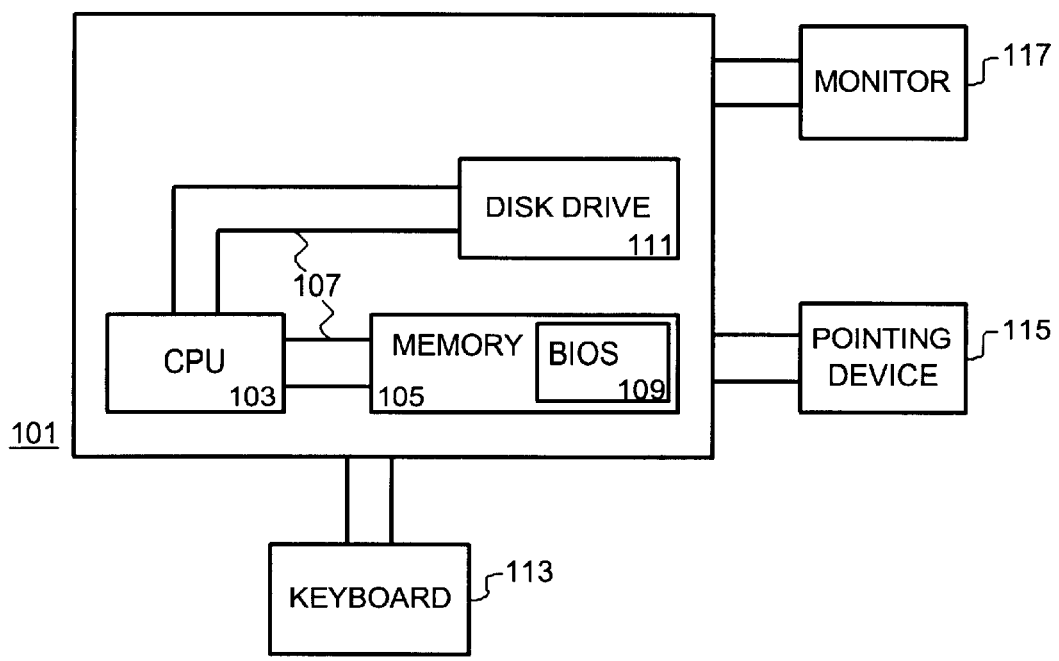
FIG. 1 is a schematic diagram of a prior art personal computer that incorporates a pointing device.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like.

With reference to FIG. 1, an exemplary environment for the invention includes a general purpose computing device in the form of a conventional personal computer 101, which includes a processing unit 103, a system memory 105, and a system bus 107 that couples various system components including the system memory 105 to the processing unit 103. The system bus 107 may be any of several types of bus structures including a memory bus or memory controller, a peripheral bus, and a local bus using any of a variety of bus architectures. The system memory 105 may include read only memory (ROM), flash memory, or random access memory (RAM). A basic input/output 109 (BIOS), containing the basic routine that helps to transfer information between elements within the personal computer 101, such as during start-up, is stored in memory 105.

The personal computer 101 further includes a disk drive 111, such as a floppy disk drive or a CD disk drive. The disk drive 111 is connected to the system bus 107. The disk drive 111 and the associated computer-readable media provide nonvolatile storage of computer readable instructions, data structures, program modules and other data for the personal computer 101.

Although the exemplary environment described herein employs a disk drive 111, it should be appreciated by those skilled in the art that other types of computer readable media which can store data that is accessible by a computer, such as magnetic cassettes, flash memory cards, digital video disks, and the like, may also be used in the exemplary operating environment.

A number of program modules may be stored on the memory 105, including an operating system, one or more application programs, other program modules, and program data. A user may enter commands and information into the personal computer 101 through input devices such as a keyboard 113 and pointing device 115. These and other input devices are often connected to the processing unit 103 through a serial port interface that is coupled to the system bus 107. A monitor 117 or other type of display device is also connected to the system bus 107 via an interface, such as a video adapter.

The personal computer 101 may operate in a networked environment using logic connections to one or more remote computers. The remote computer may be another personal computer, a server, a router, a network PC, a peer device or other network node, and typically includes many or all of the elements described above relative to the personal computer 101. Such networking environments are commonplace in offices, enterprise-wide computer network intranets and the Internet.

Figure 2:
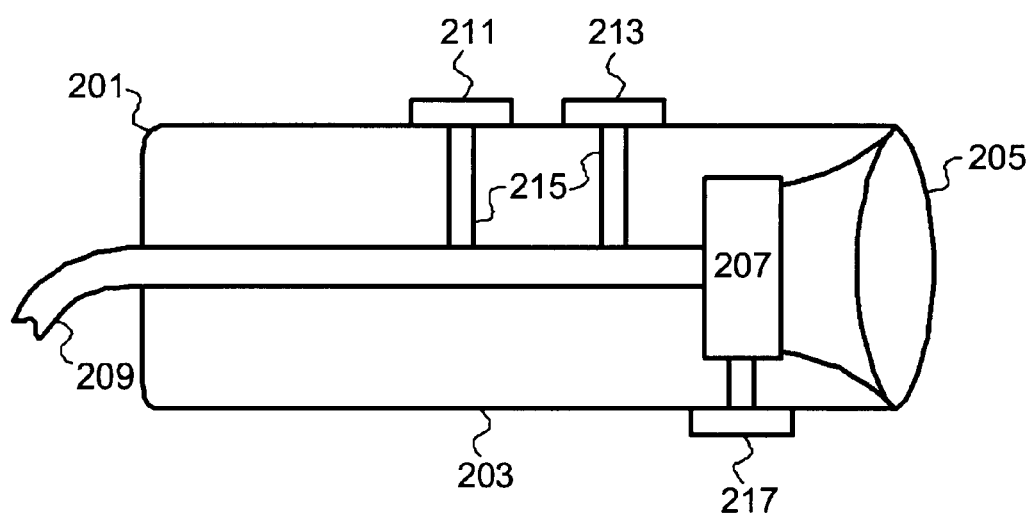
FIG. 2 is a schematic illustration of an optical mouse that may be used as the pointing device of FIG. 1.

Turning to FIG. 2, the optical mouse 201 (referred to as the pointing device 115 of FIG. 1) comprises a housing 203, an integrated circuit 207, a lens 205, first button 211, second button 213, button interfaces 215, a mode switch 217, and cable 209. The housing 203 provides support for the integrated circuit 207, the lens 205, buttons 211 and 213, button interfaces 215, and cable 209. Typically, the housing may be formed from a thermoplastic or metallic material. In one embodiment, the housing has a pen-like shape, e.g., a cylindrical housing. One end of the housing 203 has an opening. The other end of the housing 203 is closed, except for a small opening dimensioned to allow cable 209 to exit the housing.

Disposed within the open end of the housing 203 is lens 205. The lens 205 is transparent and serves to focus incoming ambient light onto the integrated circuit 207 housed within the housing 207. The term ambient light as used herein refers to light from outside of the optical mouse 201. Thus, in contrast to the prior art, the optical mouse 201 of the present invention does not include a light source for illuminating the outside environment. Further, the term ambient image as used herein refers to images outside of the optical mouse 201 that result from illumination by light not originating from the optical mouse 201. Additionally, in one embodiment, the lens 205 is similar to a conventional camera lens, where the image plane of the lens 205 is substantially longer than the focal length of the lens 205.

The integrated circuit 207 is positioned within the housing 207 such that lens 205 is operative to focus images onto the integrated circuit. In other words, the integrated circuit 207 is placed at the focal plane of the lens 205. Electrically connected to the integrated circuit 207 is cable 209. In one embodiment, the cable 209 may be a serial cable that transfers data output by the integrated circuit to the serial port of computer 101. In another embodiment, the cable 209 may be a parallel cable, a Universal Serial Bus (USB) cable, a Firewire cable, or any number of cable types. As an example, as will be seen in further detail below, a USB cable may be necessary to carry the large amounts of data output by the integrated circuit 207, when the optical mouse is operating as a camera. Further, the cable 209 may provide power to operate the integrated circuit 207.

The optical mouse 201 also includes first button 211 and second button 213. These buttons are electrically connected to cable 209 using button interfaces 215. Similar to conventional mice, the first button 211 and second button 213 (also referred to in the art as left and right buttons) serve to perform functions such as "drag and drop", "highlight", etc . . . Because the operation and configuration of the first button 211 and second button 213 are well-known in the art, further description herein is omitted.

The optical mouse 201 also includes mode switch 217 that is connected by interface 215 to cable 209. As will be seen below, the mode switch 217 controls whether or not the optical mouse 201 is operating as a mouse, or alternatively in one embodiment, as a video camera.

Figure 3:
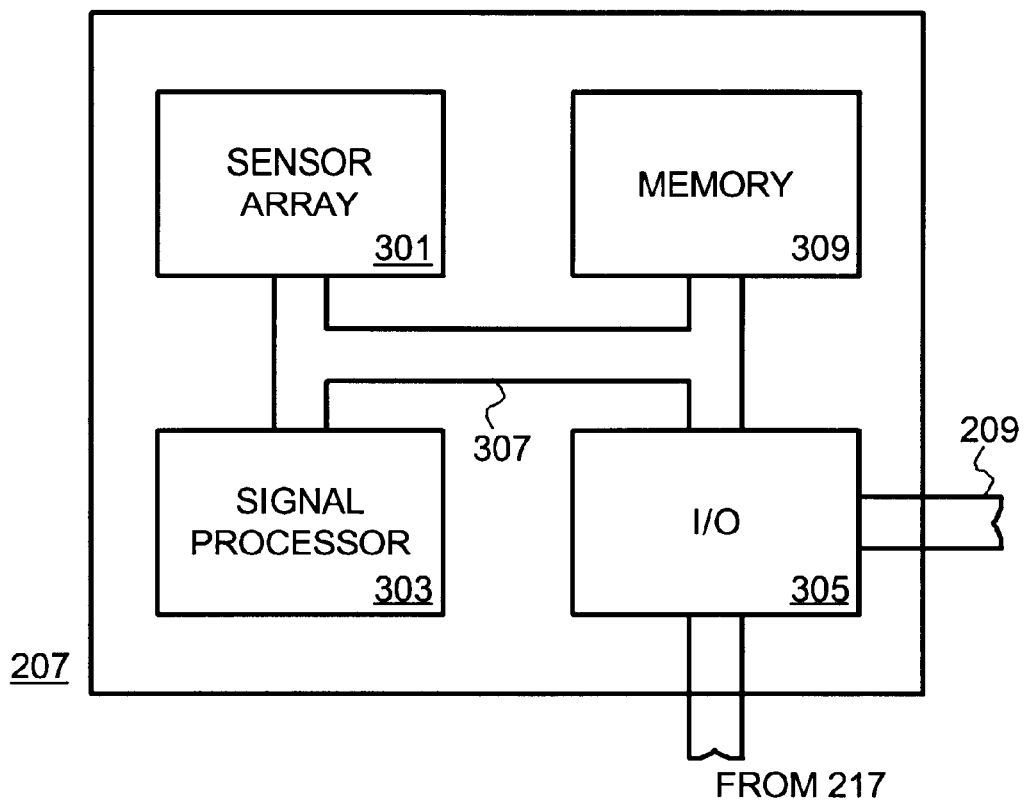
FIG. 3 is a schematic illustration of an integrated circuit suitable for use with the optical mouse of FIG. 2.

Turning to FIG. 3, the integrated circuit 207 includes a sensor array 301, a signal processor 303, an input/output (I/O) 305, memory 309, and bus 307. Preferably, each of these components is formed on a single silicon substrate and manufactured to be integrated onto a single chip using standard CMOS processes.

The sensor array 301 may be, for example, substantially similar to the sensor arrays portions of image sensors manufactured by the assignee of the present invention, OmniVision Technologies, Inc., of Sunnyvale, Calif., as model numbers OV7630, OV7920, OV7930, OV9620, OV9630, OV6910, or OV7640.

More specifically, the sensor array 301 includes a plurality of individual pixels arranged in a two-dimensional array. In operation, as the optical mouse is pointed at any arbitrary image, the image is focused onto the sensor array 301 by lens 205 such that the sensor array 301 can obtain the raw image data.

The raw image data is then received by the signal processor 303 via bus 307 to begin signal processing. The signal processor 303 is capable of executing a set of preprogrammed instructions (perhaps stored in memory 309) necessary to carry out the functions of optical mouse. The design of the signal processor 303 may be obtained from any number of companies that provide embedded microprocessor or DSP cores, as applicable. In the context of the presently illustrated embodiments, the signal processor 303 is programmed to obtain raw image data and process the raw image data to extract a feature set for a successive series of raw image data. Feature sets of successive images are compared, and using known algorithms, such as that described in U.S Pat. Nos. 6,256,016, 5,644,139, or 6,172,354, to determine the relative motion of the optical sensor 201. Other algorithms exist that may be used to determine relative motion based upon successive frames of image data.

For example, a feature extraction technique may be used that is described in a co-pending application filed Nov. 6, 2001, and assigned to the assignee of the present invention, entitled "METHOD AND APPARATUS FOR DETERMINING RELATIVE MOVEMENT IN AN OPTICAL MOUSE USING FEATURE EXTRACTION" to Shi Ge and herein incorporated by reference. Alternatively, non-feature based techniques may be used that is described in a co-pending application filed Nov. 6, 2001 as the present application, and assigned to the assignee of the present invention, entitled "METHOD AND APPARATUS FOR DETERMINING RELATIVE MOVEMENT IN AN OPTICAL MOUSE" to Xiaodong Luo and herein incorporated by reference.

Thus, the signal processor 303, which may be a microprocessor or a digital signal processor ("DSP"), is used to calculate movement of the optical mouse 201 based upon successive images captured by the sensor array 301. Once the movement has been calculated, the signal processor 303 provides X and Y movement coordinates to I/O 305, which in turn provides the coordinates to computer 101 via the cable 209.

Figure 4A:
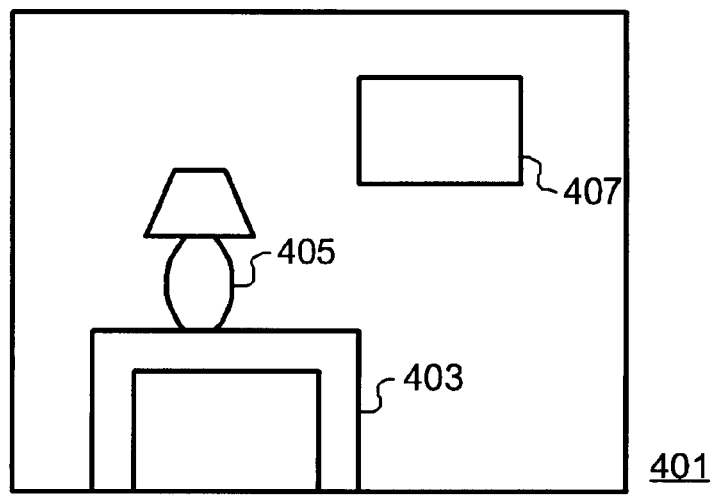
FIGS. 4A and 4B illustrate two successive images taken by the optical mouse illustrating a lateral traverse to the left.
Figure 4B:
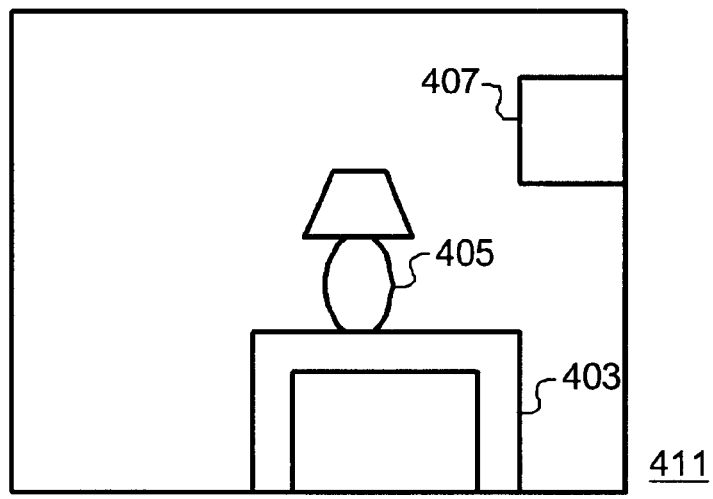

As one example of the analysis, turning to FIGS. 4A and 4B, the microprocessor 303 receives the raw image data from a first image 401 (shown in FIG. 4A). In this example, the first image 401 is an image of a wall of a room, such as an office or den. In this example, the first image 401 includes a table 403, a lamp 405, and a picture 407.

After receiving the first image 401, the processor 303 may then extract a feature set from the raw image data of a first image 401. For example, using known algorithms and methods, such as from machine vision applications, a feature set (also referred to as an abstraction) may be generated from the first image 401. The feature set may be, for example, outlines of the table 403, lamp 405, and picture 407. The feature set may be, in an alternative embodiment, areas of the image 401 that are bright or unusually colorful. It can be appreciated that the particular approach to extraction and generation of the feature set is not critical to the present invention.

After extracting the feature set from the raw image data of a first image 401, the signal processor 303 may store that feature set in memory 309. Next, the feature set of a second image 411 (shown in FIG. 4B), successive in time to the first image is extracted using the same techniques as for the first image 401. A comparison of the feature set of the second image to the feature set of the first image may be done to determine the magnitude and direction of motion of the optical mouse 201. The magnitude and direction of motion of the optical mouse 201 is also referred to as a movement vector.

Specifically, as seen in FIG. 4B, the second image 411 when compared to the first image 401 indicates that the optical mouse 201 has been shifted laterally to the left by a finite and quantifiable amount. Of course, the comparison in the present invention is performed by processor 303 by comparing the feature sets from the first image 401 and the second image 411. Using known algorithms and methods, the processor can determine the amount of translation, both horizontally and vertically, of successive images. Examples of these algorithms and methods may be seen in the '016 patent and the '354 patent discussed above.

The processor 303, based upon the amount of translation in successive images and the image rate (in terms of image frames per second). In one embodiment, the sensor array 301 is configured to obtain images at a rate of 1000 frames per second. However, it can be appreciated that this rate may be changed based upon the anticipated maximum speed by which the optical mouse 201 will be moved.

This information is then provided to the computer 101 via the I/O 305 and cable 209. The computer 101 can then utilize this information to manipulate a cursor on the monitor 117. In this manner, the optical mouse 201 of the present invention may be used to control a cursor.

Another important aspect of the optical mouse 201 is the mode switch 217. Because the optical mouse 201 is designed to operate using a lens 205 similar to that of a camera lens, the optical mouse 201 can also be used as a video camera or PC camera. In contrast, the prior art optical mice are unable to operate as a video camera. This is because the prior art optical mice are designed to operate in close proximity to a reflecting surface.

In operation, when the mode switch 217 is activated, a signal is sent to the integrated circuit 207 to cease operating as an optical mouse and begin operation as a video camera. For example, the signal from mode switch 217 may cause the signal processor to execute a set of instructions stored in memory 309. The set of instructions may reconfigure the processor 303 to cease feature extraction operation, feature set comparison, and slow down the image capture rate. Specifically, for video camera applications, the image capture rate may be reduced from 1000 frames per second (FPS) to 30 FPS. Instead of performing feature extraction, the raw image data from the sensor array 301 is directly output through I/O 305 and cable 209 to computer 101. At or near the same time, the integrated circuit 207 may transmit a signal to the computer to prepare for receipt of image data. The computer 101 then, in one embodiment, switch to an alternative mouse input device and receive the image data for either display on monitor 117, storage via disk drive 111, or other manipulation.

Advantageously, the optical mouse 201 of the present invention uses less power than the prior art because there is no need for an illuminating light. Additionally, the optical mouse 201 does not need to be in close proximity to a surface. Thus, the optical mouse 201 can literally be pointed "into the distance" and still be operative. By placing the lens 205 at the outside of the housing 203, and placing the integrated circuit 207 at the focal plane of the lens 205, ambient images of the arbitrary operating environment may be obtained. Moreover, by providing dual mode capability, not available with prior art optical mice, the cost to the consumer may be reduced by removing the need for a redundant PC camera.

While the invention is described and illustrated here in the context of a limited number of embodiments, the invention may be embodied in many forms without departing from the spirit of the essential characteristics of the invention. The illustrated and described embodiments are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. An optical mouse for providing a movement vector based on relative movement of successive images received by the optical mouse, said movement vector used to control a cursor of a computing device, the optical mouse comprising:
   a housing having an opening;
   a lens disposed within said opening, said lens operative to focus ambient images from outside said housing onto a focal plane;
   an integrated circuit located within said housing, said integrated circuit including;
   (a) a sensor array located at substantially said focal plane, said sensor array operative to receive said ambient images and output a signal indicative of said ambient images; and (b) a processor for receiving said signal indicative of said ambient image, said processor operative to receive at least two successive ambient images and determine and output said movement vector based upon a comparison of said at least two successive ambient images; and a mode switch operative to cause said integrated circuit to output said ambient images, further wherein said optical mouse does not have a light source for activating interrogating the environment.

2. The mouse of claim 1 wherein said lens has a focal plane much shorter than an image plane.

3. An optical mouse for providing a movement vector based on relative movement of successive images received by the optical mouse, said movement vector used to control a cursor of a computing device, the optical mouse comprising:

a housing having an opening;

a lens disposed within said opening, said lens operative to focus ambient images from outside said housing onto a focal plane, said focal plane being shorter than an image plane of said lens;

an integrated circuit located within said housing, said integrated circuit including:

(a) a sensor array located at substantially said focal plane, said sensor array operative to receive said ambient images and output a signal indicative of said ambient images; and (b) a processor for receiving said signal indicative of said ambient image, said processor operative to receive at least two successive ambient images and determine and output said movement vector based upon a comparison of said at least two successive ambient images; and a mode switch coupled to said integrated circuit to direct said processor to selectively output said ambient images instead of said movement vector, further wherein said optical mouse does not have a light source for activating interrogating the environment.

4. A method of providing a movement vector based on relative movement of successive images received by an optical mouse, said movement vector used to control a cursor of a computing device, said optical mouse including a housing having an opening, said optical mouse capable of operating in a camera mode, the method comprising:

disposing a lens within said opening, said lens operative to focus ambient images from outside said housing onto a focal plane;

disposing an integrated circuit within said housing, said integrated circuit including:

(c) a sensor array located at substantially said focal plane, said sensor array operative to receive said ambient images and output a signal indicative of said ambient images; and (d) a processor for receiving said signal indicative of said ambient image, said processor operative to receive at least two successive ambient images and determine and output said movement vector based upon a comparison of said at least two successive ambient images; and switching a mode switch to cause said integrated circuit to output said ambient images when in a camera mode;

further wherein said optical mouse does not have a light source for activating interrogating the environment.

5. The method of claim 4 wherein said lens is made to have a focal plane much shorter than an image plane.

* * * * *